(12) United States Patent
Manjo et al.

(10) Patent No.: US 10,994,673 B2
(45) Date of Patent: May 4, 2021

(54) VEHICLE TOP STRUCTURE

(71) Applicant: TOYOTA JIDOSHA KABUSHIKI KAISHA, Toyota (JP)

(72) Inventors: Hiroyuki Manjo, Toyota (JP); Tomoharu Tamaya, Toyota (JP); Koji Usui, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 100 days.

(21) Appl. No.: 16/540,340

(22) Filed: Aug. 14, 2019

(65) Prior Publication Data

US 2020/0070741 A1 Mar. 5, 2020

(30) Foreign Application Priority Data

Aug. 29, 2018 (JP) .............................. JP2018-160201

(51) Int. Cl.
*B60R 13/04* (2006.01)
(52) U.S. Cl.
CPC .................................. *B60R 13/04* (2013.01)

(58) Field of Classification Search
CPC ....................................................... B60R 13/04
See application file for complete search history.

(56) References Cited

FOREIGN PATENT DOCUMENTS

| JP | H06-183370 A | | 7/1994 | |
|---|---|---|---|---|
| JP | 2004-249762 A | | 9/2004 | |
| JP | 2005104300 A | * | 4/2005 | |
| JP | 2008-007000 A | | 1/2008 | |
| JP | 2008087613 A | * | 4/2008 | |
| JP | 2013-184515 A | | 9/2013 | |
| JP | 5406143 B2 | * | 2/2014 | |
| JP | 6081066 B2 | * | 2/2017 | |
| WO | WO-0206087 A1 | * | 1/2002 | ............. B60R 13/04 |

* cited by examiner

*Primary Examiner* — Lori L Lyjak
(74) *Attorney, Agent, or Firm* — Oliff PLC

(57) ABSTRACT

A vehicle includes a roof molding made of an elastic member disposed in a groove on a roof top surface formed in a coupling portion coupling a roof panel and a right side panel. The roof molding includes a lid portion covering an upper side of an opening portion of the groove. The roof panel includes a slope face descending toward the groove between a base face and the groove. An end of the lid portion of the roof molding extends to the slope face and is in contact with the slope face.

6 Claims, 7 Drawing Sheets

VEHICLE TOP STRUCTURE

CROSS REFERENCE TO RELATED APPLICATION

This application claims priority to Japanese Patent Application No. 2018-160201 filed on Aug. 29, 2018, which is incorporated herein by reference in its entirety including the specification, claims, drawings, and abstract.

TECHNICAL FIELD

The present disclosure relates to a vehicle top structure including a roof molding disposed in a groove in a coupling portion coupling a roof panel and a side panel.

BACKGROUND

A vehicle may include a roof molding disposed in a groove formed by a roof panel and a side panel.

Patent Document 1 listed below discloses a structure including a roof molding configured to be inserted in an upward groove formed within a plane which is one step below a base face covering a substantial portion of a roof panel. The roof molding includes a lid portion covering an upper side of a groove opening. The lid portion is formed to extend beyond the opening toward the roof panel and the side panel. The roof molding further includes a column portion attached to an undersurface of the lid portion to extend downward, and a leg portion extending along the width of the groove under the column portion. The leg portion is inserted in the groove to fix the roof molding to the groove.

Patent Document 2 listed below discloses a structure including a roof molding configured to be buried in a groove in a region further inward with respect to an opening portion of the groove. The roof molding has a lid portion having a downward convex shape under the opening portion. The roof molding further includes, on an undersurface of the lid portion, a securing protrusion protruding horizontally to be continuously urged strongly against a side wall in the width direction of the groove.

CITATION LIST

Patent Literature

[Patent Document 1] JP 2013-184515 A
[Patent Document 2] JP 2004-249762 A

SUMMARY

The structure described in Patent Document 1 includes a comparatively large interval between the base face and the roof molding, which results in two parting lines between an edge of the base face and an edge of the roof molding. These parting lines may give an unsophisticated design impression.

The structure described in Patent Document 2 houses the roof molding fitted within the groove; however, this structure does not solve the design issue concerning parting lines near the groove.

Embodiments of the present disclosure are therefore directed toward increasing design quality of a roof molding which covers a top of an opening of a groove formed in a coupling portion coupling a roof panel and a side panel.

In accordance with an aspect of the disclosure, a vehicle top structure includes a groove on a top surface of a roof, which is formed in a coupling portion coupling a roof panel and a side panel of a vehicle, and a roof molding made of an elastic member and configured to be disposed in the groove. The roof molding includes a lid portion configured to cover an upper side of an opening portion of the groove. In the vehicle top structure, the roof panel includes a slope face between a base face of the roof panel and the groove, and the slope face descends from an end of the base face toward the groove. When the roof molding is disposed in the groove, an end of the lid portion closer to the roof panel is in contact with the slope face.

As used herein, the term "roof panel" refers to a primary panel forming an outer surface of a roof. A "side panel" refers to a panel located further outward with respect to the roof panel to form an outer surface of a part of the roof. The roof panel or the side panel may further form a face other than the roof, such as a side face or a rear face of a vehicle. A "base face" of the roof panel refers to a smoothly extending region that substantially forms a roof outer surface formed by the roof panel. A "slope face" refers to a face formed between the base face of the roof panel and the groove and descending from the base face. The slope face is actively formed; that is, it should be distinguished from a slope region which simply appears in a bent portion of the roof panel by forming a groove beside the base face. The slope face may be either a flat face or a curved face.

According to one embodiment of the vehicle top structure, the roof panel may further include, between the slope face and the groove, a lower step face extending horizontally from an end of the slope face to an open end of the groove at a height lower than the base face, and the lower step face may be configured to receive the lid portion of the roof molding. The lower step face may be provided to allow stable disposal of the roof molding. Further, disposing the roof molding at a lower position may reduce the air resistance or increase design quality by de-emphasizing the presence of the roof molding.

According to another embodiment of the vehicle top structure, the roof molding may further include a leg portion extending along a width of the groove and having opposite ends configured to be inserted in the groove, a column portion coupling the lid portion and the leg portion, and a protrusion formed on an undersurface of the lid portion to extend downward, and configured to face the roof panel when the roof molding is disposed in the groove.

According to a further embodiment of the vehicle top structure, the roof molding may further include a leg portion extending along a width of the groove and having opposite ends configured to press opposite side wall faces of the groove, a column portion coupling the lid portion and the leg portion, and a protrusion including a first wall portion disposed on an undersurface of the lid portion at a location further toward the roof panel with respect to the column portion and extending downward, and a second wall portion extending from the first wall portion toward the roof panel. In the vehicle top structure, when the roof molding is disposed within the groove, the second wall portion may face the side wall face of the groove.

According to a further embodiment of the vehicle top structure, the lid portion may include a brittle part between the protrusion and the column portion, and when a portion of the lid portion close to the roof panel is lifted upward, the lid portion may undergo relatively large deformation around the brittle part.

In the vehicle top structure according to the disclosure, the roof molding covers a portion of the roof panel extending to the slope face. This structure may increase design quality by giving a simple and sophisticated visual impression, as compared to a structure having a roof molding that covers only a region near the groove.

BRIEF DESCRIPTION OF DRAWINGS

Embodiments of the present disclosure will be described by reference to the following figures, wherein.

DESCRIPTION OF EMBODIMENTS

Embodiments will be described below by reference to the drawings. While specific embodiments are described for ease of understanding, these embodiments are for illustrative purpose only and various other embodiments may also be applicable.

Figure 1:
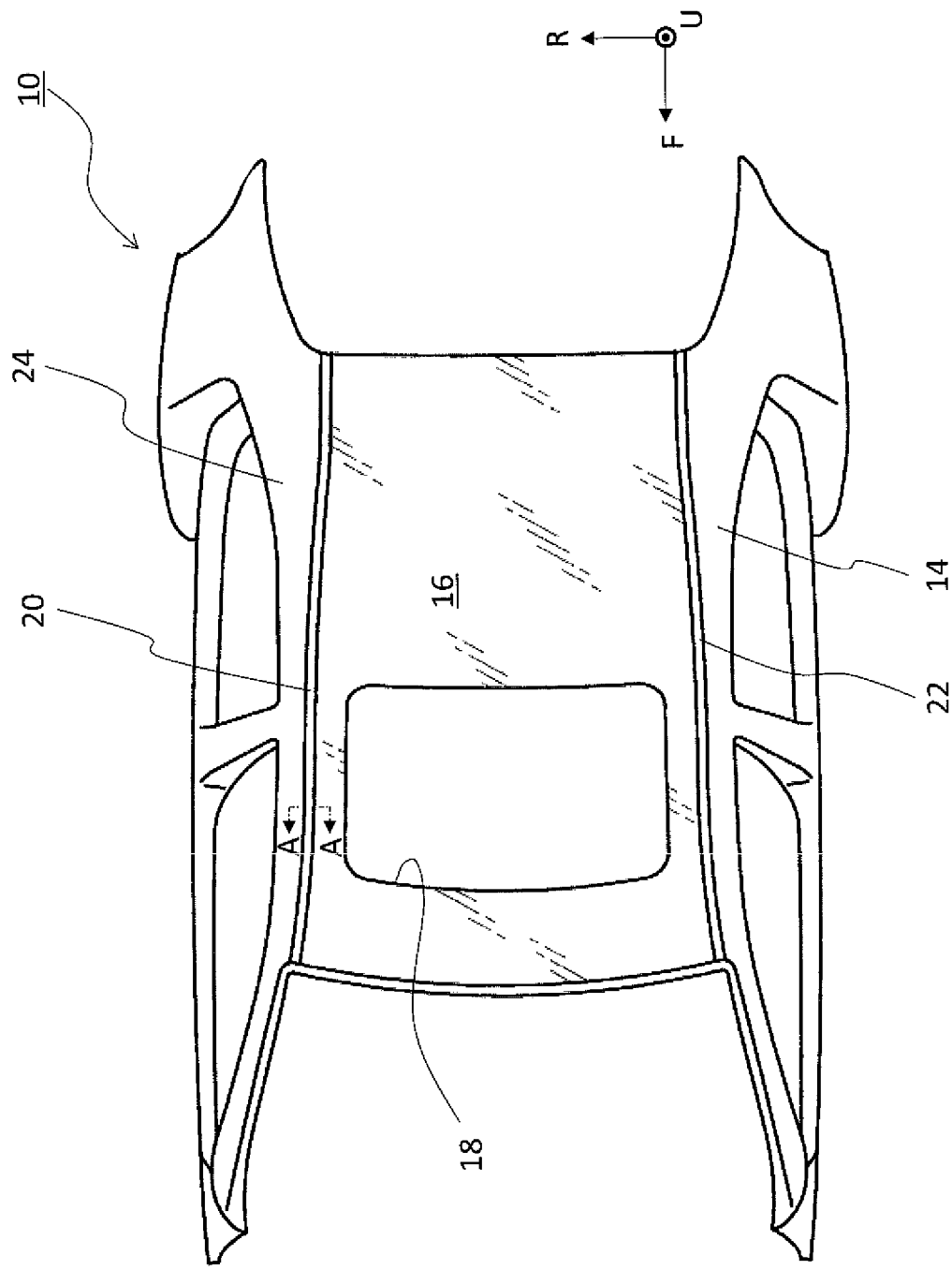
FIG. 1 is a plan view illustrating a structure of a whole top portion of a vehicle according to an embodiment.

FIG. 1 is a plan view schematically illustrating a vehicle top structure 10 according to an embodiment. In the coordinate system in the drawing, an F axis indicates a vehicle forward direction, an R axis indicates a vehicle rightward direction seen from the viewpoint of a passenger, and a U axis indicates a vehicle upward direction (vertically upward direction). The vehicle top structure 10 includes a right side panel 24 forming a right side of a vehicle, a left side panel 14 forming a left side of the vehicle, and a roof panel 16 disposed between these side panels. The roof panel 16 is a plate member forming a roof of the vehicle. The roof panel 16 includes, near its center, a window frame 18 to which a window called a sunroof or a glass roof is attached. However, the roof panel 16 need not necessarily include the window frame 18. The vehicle top structure 10 further includes, between the roof panel 16 and the right side panel 24 and between the roof panel 16 and the left side panel 14, roof moldings 20 and 22, respectively, extending longitudinally in the vehicle along a coupling line coupling the roof panel 16 and the right side panel 24 and a coupling line coupling the roof panel 16 and the left side panel 14, respectively.

Figure 2:
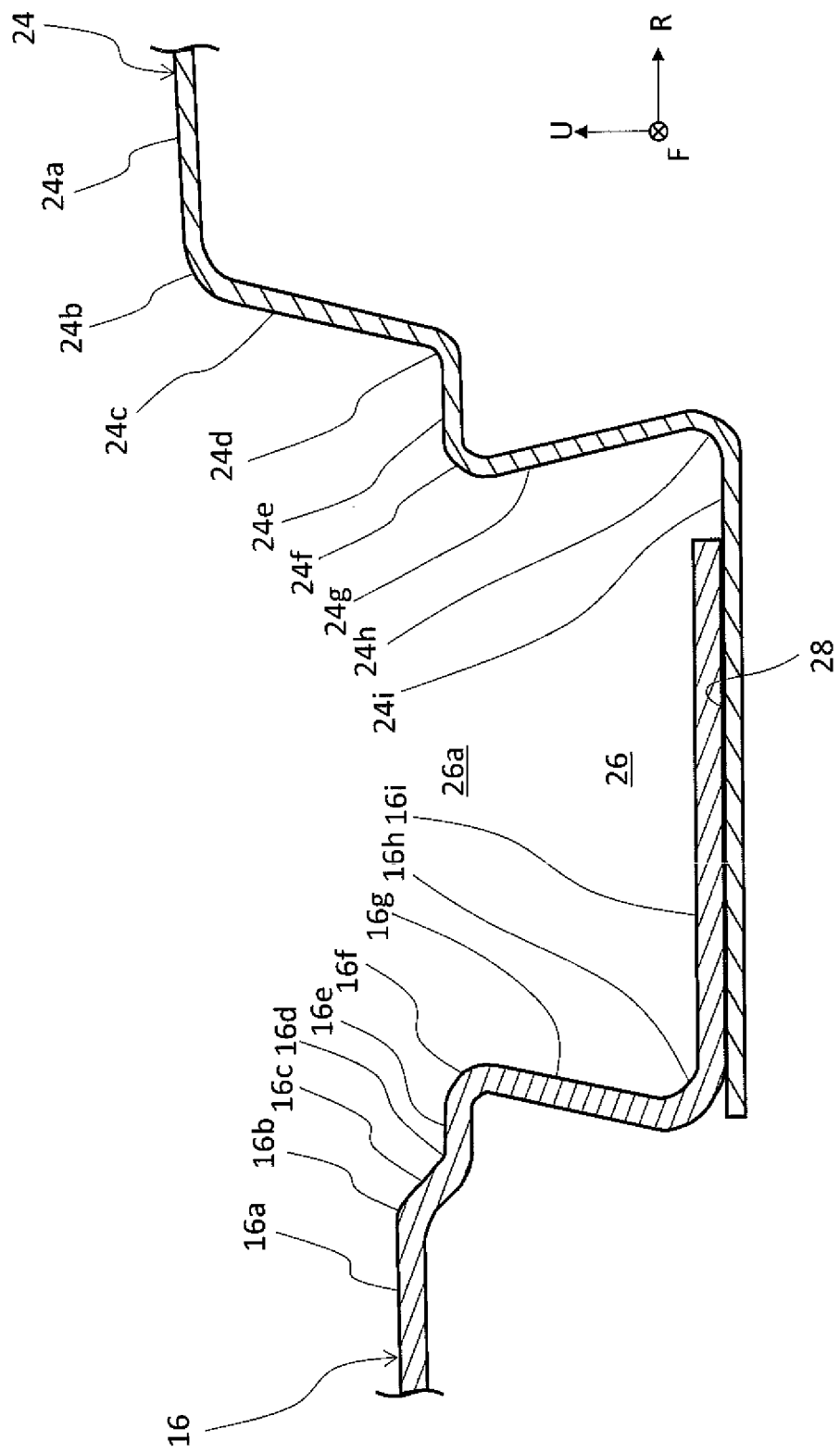
FIG. 2 is a cross sectional view taken along A-A line in FIG. 1, illustrating a structure near a groove.
Figure 3:
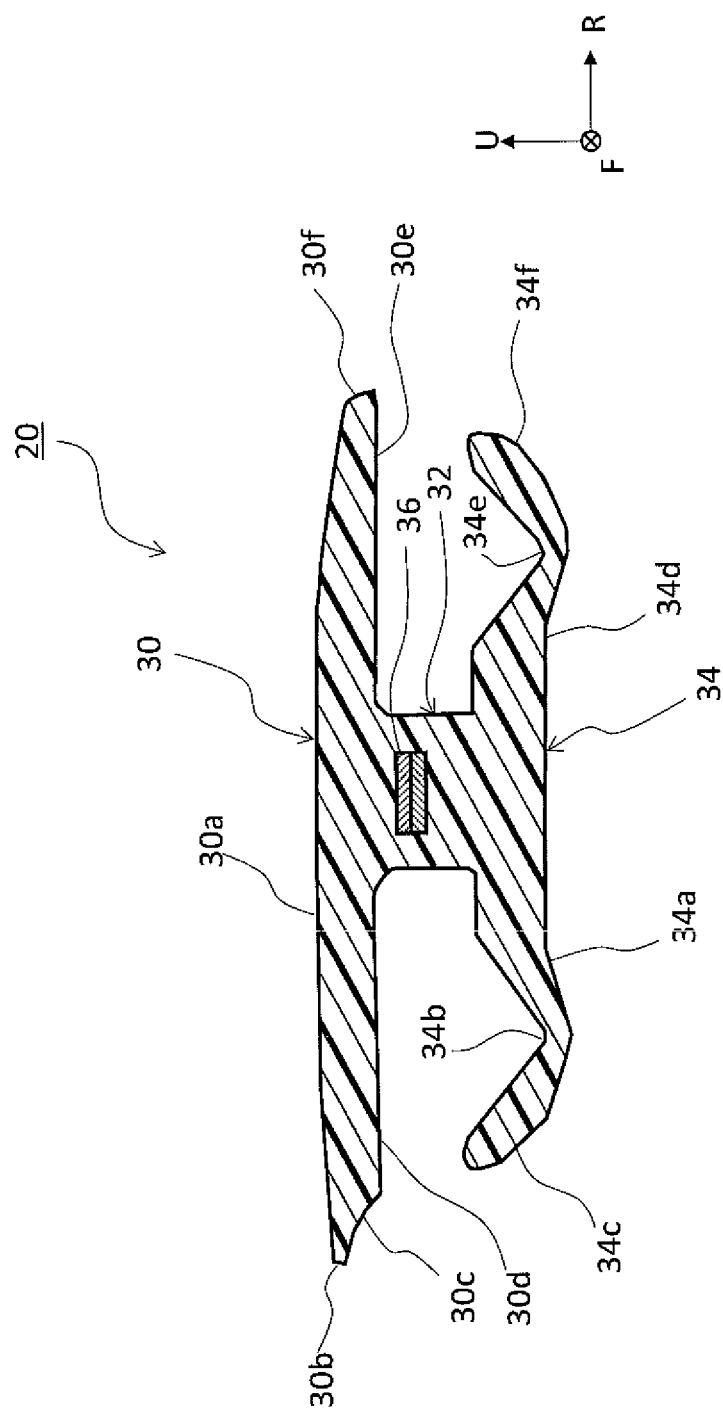
FIG. 3 is a cross sectional view taken along A-A line in FIG. 1, illustrating a structure of a roof molding.
Figure 4:
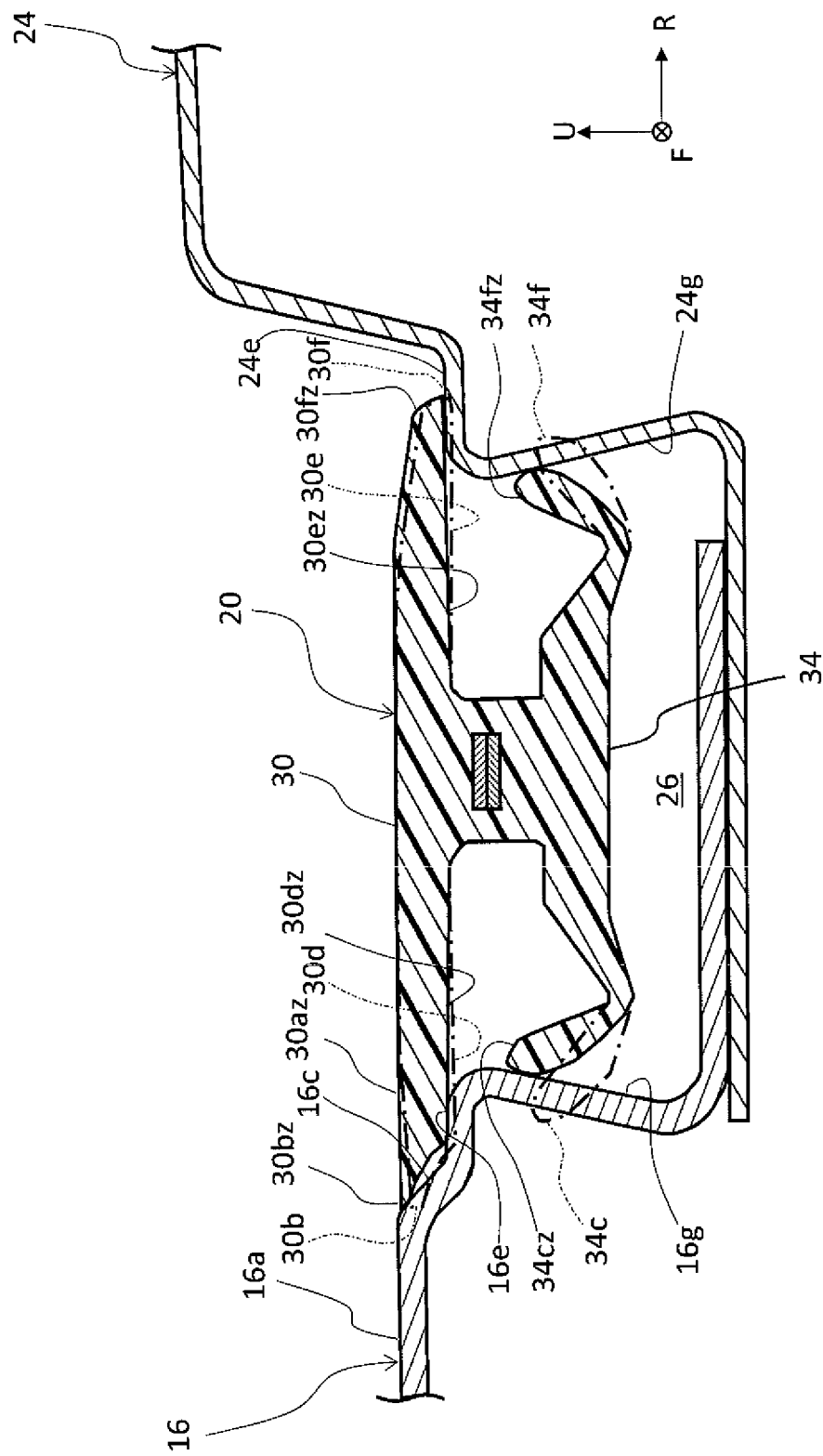
FIG. 4 is a cross sectional view of the roof molding illustrated in FIG. 3 when disposed in the groove illustrated in FIG. 2.

FIG. 2, FIG. 3, and FIG. 4 are end views of an end face A-A taken along line A-A in FIG. 1 (a plane including the R axis and the U axis). FIG. 2 illustrates an end face before the roof molding 20 is mounted, and FIG. 3 illustrates a cross section of the roof molding 20 before being mounted. FIG. 4 illustrates the roof molding 20 which is mounted.

FIG. 2 illustrates a groove 26 formed by a three-dimensional shape of the roof panel 16 and the right side panel 24. The roof panel 16 is bent downward at a bent portion 16b located on the right edge of a base face 16a forming a substantial portion of the roof, and includes, on the right of the bent portion 16b, a slope face 16c inclined downward toward the right. The slope face 16c receives an end 30b of the roof molding 20, which will be described below. The roof panel 16 is further bent horizontally at a bent portion 16d at the right end of the slope face 16c, and further includes a substantially horizontal and flat lower step face 16e on the right of the bent portion 16d. The lower step face 16e is located one step lower than the base face 16a, and receives an undersurface 30d of a lid portion 30 of the roof molding 20, which will be described below. The roof panel 16 is further bent downward at a bent portion 16f on the right end of the lower step face 16e, and includes a side wall face 16g of the groove 26 under the bent portion 16f. The roof panel 16 is further bent horizontally at an acute angle at a bent portion 16h on the lower end of the side wall face 16g, and further includes a bottom face 16i of the groove 26 to the right of the bent portion 16h.

The right side panel 24 is formed by bending a plate member, and forms an outer surface of a vehicle in a region from the top of the vehicle on the right side to a portion near the roof right portion. The right side panel 24 may also be referred to as a right side member outer panel.

The right side panel 24 includes a top face 24a that forms a vicinity of the right end of the roof. The right side panel 24 is bent downward on the right side of the top face 24a, which is not shown, to form a right side of the vehicle. The right side panel 24 includes a bent portion 24b on the left end of the top surface 24a, and further includes, on the left of the bent portion 24b, a slope face 24c which is inclined downward toward the left direction. The right side panel 24 further includes, on the left end of the slope face 24c, a bent portion 24d, and includes, to the left of the bent portion 24d, a planar face 24e. The right side panel 24 further includes, on the left end of the planar face 24e, a bent portion 24f which is bent downward, and, under the bent portion 24f, a side wall face 24g of the groove 26. The right side panel 24 further includes a bent portion 24h on the lower end of the side wall face 24g. The right side panel 24 is formed as a flat bottom face 24i to the left of the bent portion 24h.

The undersurface of the bottom face 16i of the roof panel 16 and the top face of the bottom face 24i of the right side panel 24 are coupled to form a coupling portion 28. The roof panel 16 and the right side panel 24 are each formed by bending a steel plate, for example. In this structure, the coupling portion 28 is formed by welding, such as spot welding. The roof panel 16 and the right side panel 24 may also be formed of an aluminum alloy, for example. In this structure, the coupling portion 28 may be formed using a combination of an adhesive and bolt clamping, for example.

The roof panel 16 and the right side panel 24 are bent as described above and coupled together, so that the groove 26 extending along the length of a vehicle between the roof panel 16 and the right side panel 24 is formed between the roof panel 16 and the right side panel 24. The groove 26 has an opening portion 26a (which refers to a region connecting the bent portion 16f of the roof panel 16 and the bent portion 24f of the right side panel 24) located one step below the base face 16a of the roof panel 16. The opening portion 26a is flush with the lower step face 16e of the roof panel 16 and the planar face 24e of the right side panel 24. The opening portion 26a of the groove 26 has a width which is smaller than that of the bottom, because the side wall face 16g of the roof panel 16 and the side wall face 24g of the right side panel 24 are formed to expand further toward the bottom in the width direction of the groove 26.

Referring now to FIG. 3, the roof molding 20 will be described. The roof molding 20 includes the lid portion 30, a column portion 32, and a leg portion 34 to have an UR end face having a substantially H shape. The lid portion 30 covers the top of the opening portion 26a. The lid portion 30 has a top surface 30a which is substantially flat but slightly protrudes upward. The lid portion 30 has the end 30b closer to the roof panel 16, having a smaller thickness and sharper shape toward the tip end. Specifically, in the region near the end 30b, the top surface 30a of the lid portion 30 remains substantially flat, whereas the undersurface of the lid portion 30 includes a slope face 30c to thereby make the end 30b thinner. Portions of undersurfaces 30d and 30e of the lid portion 30 located inward with respect to the slope face 30c are substantially flat but protrude slightly upward. In inserting the lid portion 30 into the groove 26, the slightly protruding portions of the undersurfaces 30d and 30e are flattened by their elastic deformation, which is used to bring the end 30b into close contact with the slope face 16c and bring the undersurface 30d into close contact with the lower step face 16e. At an end 30f of the lid portion 30 closer to the side panel, the undersurface 30e remains substantially flat, whereas the top surface 30a is inclined downward to form a slightly tapered tip portion.

The column portion 32 is a columnar member extending downward from the undersurfaces 30d, 30e near the center of the lid portion 30. The column portion 32 includes am embedded core member 36 made of metal or hard resin; however, the column portion 32 may not necessarily include the core member 36.

The leg portion 34 extends along the width of the groove 26 symmetrically under the column portion 32. The leg portion 34 includes, toward the left from the column portion 32, a left leg portion 34a connected with the column portion 32, a bent portion 34b that is bent at the leading end of the left leg portion 34a, and a left foot portion 34c located further outward from the bent portion 34b to extend upward. Similarly, the leg portion 34 includes, toward the right, a right leg portion 34d, a bent portion 34e, and a right foot portion 34f.

The roof molding 20 is produced by extrusion molding of a resin along with the core member 36. The resin which is used has a flexibility to allow the roof molding 20 to follow the shape of the groove 26 to a certain degree and to be secured to the groove 26 using elastic deformation, and has elasticity to allow the lid portion 30 to be closely attached around the groove 26. Specifically, polyvinyl chloride resin, ABS resin, fluorocarbon polymer, olefinic elastomer, or styrene elastomer, for example, may be used alone or in combination.

An outer layer may be attached (integrally or separately) to the top surface 30a of the lid portion 30 of the roof molding 20 to enhance design quality. Alternatively, coating may be applied to the top surface 30a to thereby increase design quality.

FIG. 4 is an end view illustrating the roof molding 20 mounted in the groove 26. The roof molding 20 is press fit down into and secured to the groove 26, which makes the shape illustrated in FIG. 3 slightly deformed. FIG. 4 indicates the shape before insertion by dashed and single-dotted lines, and indicates the shape after insertion by solid lines. Portions of the roof molding 20 deformed after insertion are denoted by corresponding numerical references with "z".

The roof molding 20 is press fit down into and mounted in the groove 26. The left foot portion 34c and the right foot portion 34f at the opposite ends of the leg portion 34, which are longer in the width direction than the width of the opening portion 26a and the length between the side wall faces 16g and 24g of the groove 26, are significantly bent upward by elastic deformation during the press fit. After insertion, the left foot portion 34cz is pressed by the side wall face 16g to bend upward, and the right foot portion 34fz is pressed by the side wall face 24g to bend upward. As the roof molding 20 is formed of an elastic resin, outward faces of the left foot portion 34cz and the right foot portion 34fz press the side wall faces 16g and 24g, respectively, by restoring force of the elastic deformation to resist against the bending. This secures the roof molding 20 firmly to the groove 26.

The lid portion 30 of the roof molding 20 is also deformed when the roof molding 20 is inserted. More specifically, the undersurface 30d of the lid portion 30 closer to the roof panel 16 is pressed onto the lower step face 16e to make the end 30b contact the slope face 16c, and to elastically deform the lid portion 30 to curve upward. After the deformation, the undersurface 30dz is pressed onto and closely attached to the lower step face 16e by the restoring force of the elastic deformation of the lid portion 30z, and the end 30bz is pressed onto and closely attached to the slope face 16c by restoring force of elastic deformation of the lid portion 30z. The undersurface 30e of the lid portion 30 is pressed onto the planar face 24e closer to the right side panel 24, thereby causing elastic deformation. After the deformation, the undersurface 30ez of the lid portion 30z is pressed onto and closely attached to the planar face 24e by restoring force of the elastic deformation. This deformation further causes the end 30fz to be displaced slightly upward.

After the insertion, the end 30bz of the lid portion 30z of the roof molding 20 closer to the roof panel 16 is disposed within the slope face 16c of the roof panel 16. The top surface 30az of the lid portion 30z is therefore located slightly lower than the base face 16a of the roof panel 16. This structure decreases presence of the roof molding 20 in the roof of the vehicle to thereby increase the design quality. The structure further reduces the wind pressure acting on the roof molding 20 during high-speed traveling, thereby preventing or reducing increased air resistance and also prevents or reduces lift-up of the end 30bz caused by the wind pressure. This structure further prevents and reduces entrance of foreign materials such as rain and sand into the groove 26 through the end 30bz.

The roof panel 16 and the right side panel 24 that are made of metal thermally expand with temperature increase and thermally contract with temperature decrease. Therefore, the opening portion 26a of the groove 26 is narrowed at high temperatures and is widened at lower temperatures. On the other hand, the roof molding 20 made of resin thermally contracts by a smaller amount than the roof panel 16 and the right side panel 24, and therefore displaces only slightly within the groove 26. The length of the end 30b of the lid portion 30 in the roof molding 20 is set such that the end 30b remains within the slope face 16c after a temperature change. Further, the slope face 30c formed under the end 30b and the slope face 16c of the roof molding 20 are set to have angles and shapes that allow formation of a space between them. This structure avoids interference between the slope face 16c and the slope face 30c, which prevents the end 30b from coming into close contact with the slope face 16c, even when the end 30b moves within the slope face 16c.

Figure 5:
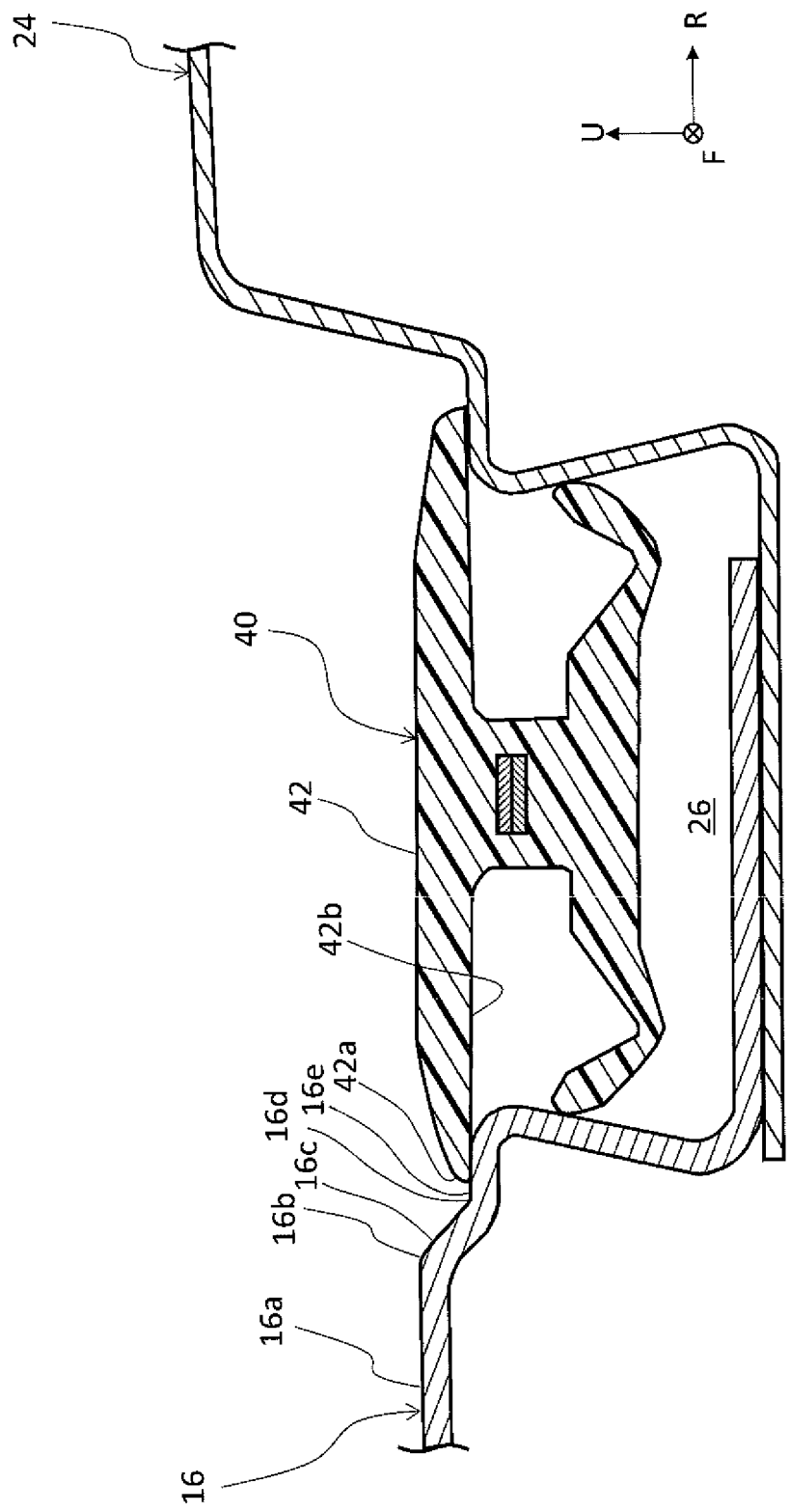
FIG. 5 is a cross sectional view of a reference roof molding disposed in a groove.

Design quality of the roof molding 20 illustrated in FIG. 4 will be described by comparing the roof molding 20 with a reference roof molding 40 illustrated in FIG. 5. FIG. 5 shows a state where the roof molding 40, in place of the roof molding 20 in FIG. 4, is inserted in the groove 26. In FIG. 5, elements identical with those in FIG. 4 are denoted by the same numerical references. In the following description, "z" in reference numerals indicating the state after insertion will be omitted.

The roof molding 40 illustrated in FIG. 5 has a structure which is similar to that employed in Patent Document 1 described above. The roof molding 40 differs from the roof molding 20 in the shape of an end 42a of a lid portion 42 that is closer to the roof panel 16. The end 42a in the roof molding 40 extends only to the middle of the lower step face 16e of the roof panel 16. Therefore, the lid portion 42A does not cover a part of the lower step face 16e of the roof panel 16, covers neither the bent portion 16d nor the slope face 16c. A person observing this vehicle top structure from the vicinity thereof would typically first recognize clear contrast near the bent portion 16b of the roof panel 16, although this depends on surrounding brightness or the position of a light source. Specifically, the base face 16a of the roof panel 16 has a small curvature and has color, luster, and reflection that are substantially uniform across the plane, whereas the slope face 16c which is angled has different color, luster, and reflection, which results in the clear contrast described above.

Clear contrast would be further recognized in the boundary between the roof panel 16 and the roof molding 40, because the roof panel 16 and the roof molding 40 are made of different materials with different colors, lusters, and reflection. This would make the observer recognize two border lines around the boundary between the roof panel 16 and the roof molding 40 in the vehicle top structure illustrated in FIG. 5. Further variations caused by the bent portion 16d may be observed when the observer sees the structure more carefully, which would give a confusing impression.

In contrast, in the vehicle top structure illustrated in FIG. 4, the end 30b of the roof molding 20 and the end of the base face 16a of the roof panel 16 are close to each other. This would make a person who observes this vehicle top structure from the vicinity thereof recognize only a single borderline, which may be a rather thick line, near the boundary between the end 30b of the roof molding 20 and the end of the base face 16a. It can be therefore expected that the vehicle top structure illustrated in FIG. 4 provides a simpler and more sophisticated design as compared with that of the vehicle top structure illustrated in FIG. 5.

In the vehicle top structure illustrated in FIG. 4, the region closer to the right side panel 24 has a shape similar to that of the vehicle top structure illustrated in FIG. 5. In the region toward the right side panel 24, a significant visual effect can be obtained by the top surface 24a of the right side panel 24, which is greatly raised, and such a visual effect is not believed to cause significant differences in design resulting from a variation in the shape of the roof molding 20, as compared to such a variation in the roof molding 20 in the region closer to the roof panel 16.

Figure 6:
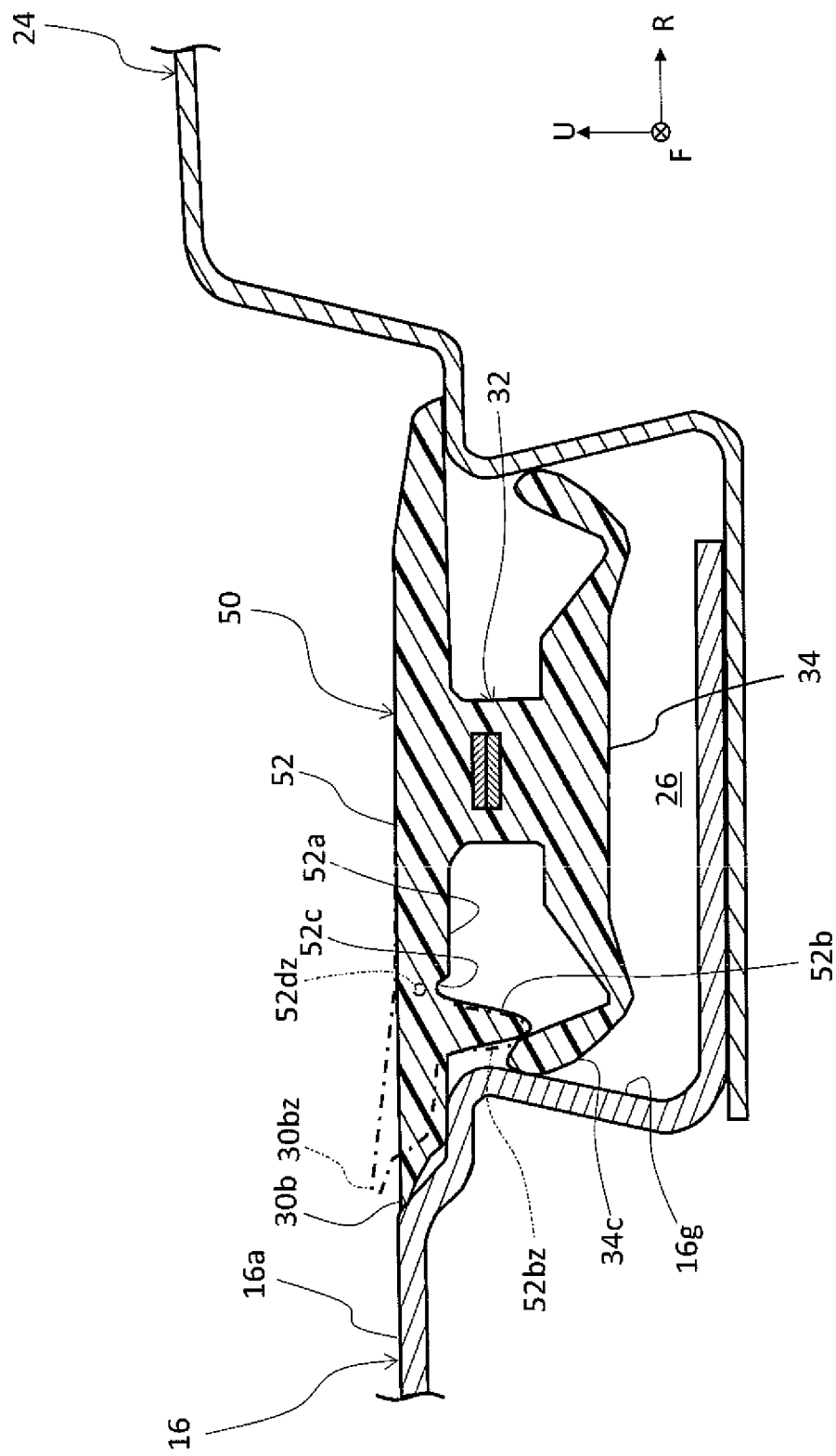
FIG. 6 is a cross sectional view illustrating a roof molding having a removal preventing structure when disposed in a groove.

Referring further to FIG. 6, a modification example embodiment will be described. FIG. 6 illustrates a vehicle top structure including a roof molding 50 in place of the roof molding 20 in the vehicle top structure illustrated in FIG. 4. In FIG. 6, elements identical with those in FIG. 4 are denoted by the same reference numerals. However, unlike FIG. 4, FIG. 6 does not show the shape of the roof molding 50 before insertion. FIG. 6 illustrates deformation of the roof molding 50 after insertion by a dashed and single-dotted line and corresponding reference numerals with "z".

The roof molding 50 in FIG. 6 includes the leg portion 34 having the same structure as that of the leg portion 34 of the roof molding 20 illustrated in FIG. 4. Therefore, when the roof molding 50 is secured within the groove 26, the outward face of the left foot portion 34c and the side wall face 16g of the roof panel 16 press each other. The end 30b of a lid portion 52 of the roof molding 50 closer to the roof panel 16 also has a shape similar to that of the end 30b of the roof molding 20 illustrated in FIG. 4.

The roof molding 50 has the following characteristics: it has a protrusion 52b protruding downward from an undersurface 52a of the lid portion 52; and it further has a brittle part 52c located closer to the column portion 32 with respect to the protrusion 52b and formed by thinning a portion of the undersurface 52a. When the roof molding 50 is inserted in the groove 26, the protrusion 52b is in contact with the inward face (the face closer to the column portion 32) of the left foot portion 34c to urge the left foot portion 34c outward. Thus, in addition to elastic force acting through the entire leg portion 34, force from the protrusion 52b is further exerted to the outward face of the left foot portion 34c, which then presses the side wall face 16g. This secures the entire roof molding 50 to the groove 26 with comparatively strong force.

A situation where upward external force is applied to the end 30b of the roof molding 50 will now be considered. The external force may be caused, for example, by wind pressure, intrusion of foreign matter, or the like. When the end 30bz is lifted upward, the lid portion 52 deforms around the brittle part 52c comparatively easily. Specifically, a portion of the lid portion 52 located further toward the roof panel 16 with respect to the brittle part 52c slightly rotates clockwise about a rotation center 52dz located above the brittle part 52c. The protrusion 52bz thus rotated presses the inward face of the left foot portion 34c strongly outward. A force (moment) rotating counterclockwise is applied, as a reaction, to the protrusion 52bz, which transmits the moment toward the end 30bz, to thereby limit the motion of the end 30bz. Simultaneously, the pressing force by the outward face of the left foot portion 34c against the side wall face 16g increases to thereby increase frictional force acting between the outward face of the left foot portion 34c and the side wall face 16g, thereby preventing removal of the left foot portion 34c from the groove 26.

The end 30b of the roof molding 50 extends longer toward the roof panel 16 than the end 30b of the roof molding 40 illustrated in FIG. 4. This structure may raise a possibility that, when upward external force is applied to the end 30b, the roof molding 50 would be removed from the groove 26 comparatively easily. The same problem would also arise when, for example, the groove 26 has a great width and the end 30b of the roof molding 50 needs to be long. The roof molding 50, however, includes the protrusion 52b to resist the external force and also includes the brittle part 52c to control deformation to thereby enhance the effect of the protrusion 52b. The positions and shapes of the protrusion 52b and the brittle part 52c, and the position and shape of the left foot portion 34c pressing the protrusion 52b may be modified, as appropriate. In deformation, removal preventing effect is increased by allowing the protrusion 52b to urge the left foot portion 34c while preventing the protrusion 52b from slipping on the left foot portion 34c and allowing the urged left foot portion 34c to press the side wall face 16g while preventing the left foot portion 34c from slipping on the side wall face 16g. This removal preventing structure may be similarly provided in a region closer to the right side panel 24.

In the above description, when the roof molding 50 is inserted in the groove 26, the protrusion 52b of the roof molding 50 in FIG. 6 is in contact with the inward face (the face closer to the column portion 32) of the left foot portion 34c to press the left foot portion 34c outward. However, in a normal state, the protrusion 52b may be simply in contact with the left foot portion 34c without pressing the left foot portion 34c. In this structure, as soon as the end 30b of the roof molding 50 slightly deforms due to upward external force applied thereto, the protrusion 52b presses the left foot portion 34c. Alternatively, in a normal state, the protrusion 52b may be separated from the left foot portion 34c without contacting the left foot portion 34c. In this structure, after the end 30b of the roof molding 50 deforms to a certain degree due to upward force, the protrusion 52b presses the left foot portion 34c. As the removal preventing effect cannot be obtained when the protrusion 52b and the left foot portion 34c are excessively apart from each other in a normal state, the distance between the protrusion 52b and the left foot portion 34c should be set within a range that achieves the removal preventing effect.

Figure 7:
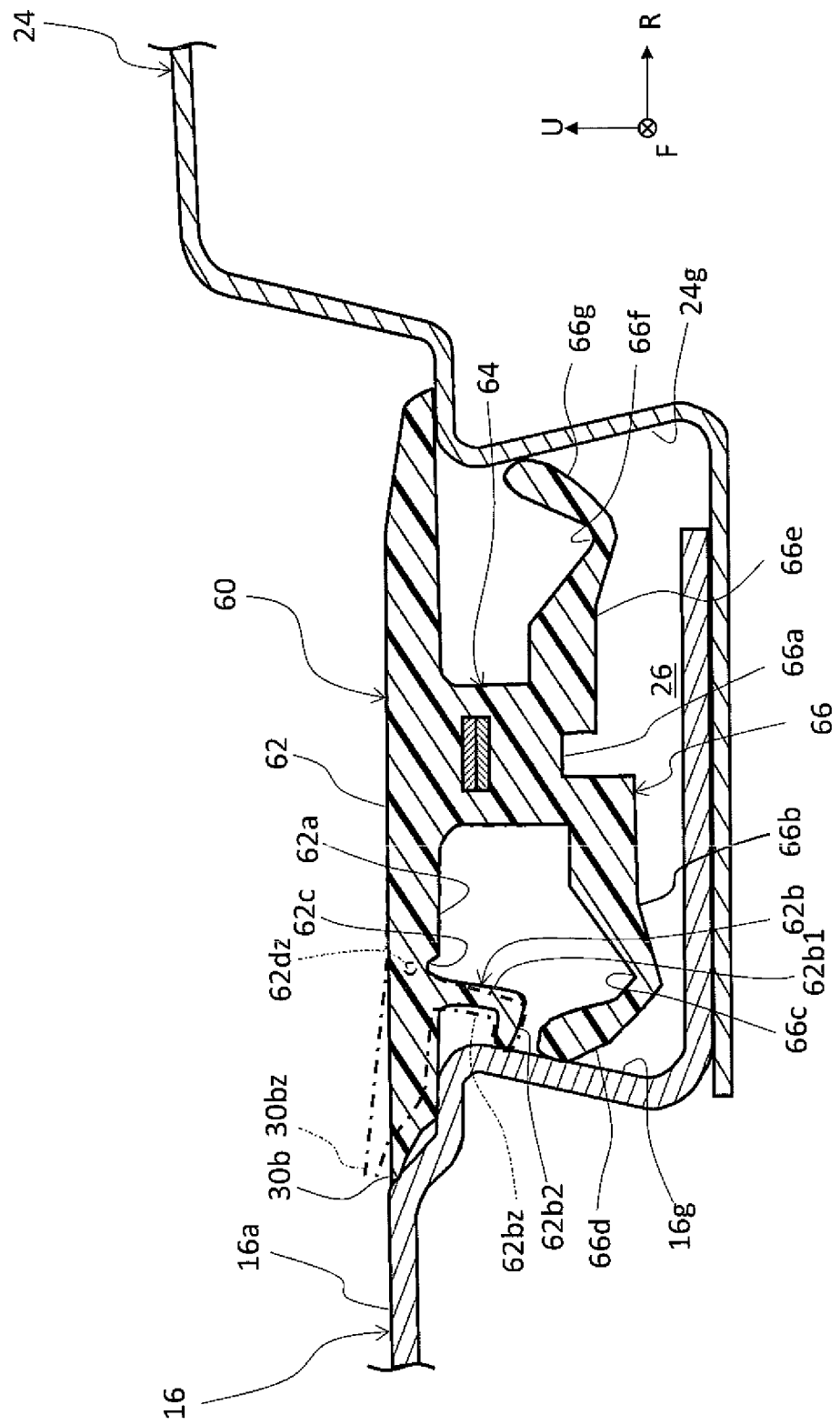
FIG. 7 is cross sectional view of a roof molding having a removal preventing structure according to another embodiment.

Referring to FIG. 7, another embodiment concerning a removal preventing structure will be described. The vehicle top structure illustrated in FIG. 7 includes a roof molding 60 in place of the roof molding 20 of the vehicle top structure illustrated in FIG. 4. Elements in FIG. 6 that are identical with those in FIG. 4 are denoted by the same reference numerals. However, unlike FIG. 4, FIG. 6 does not show the shape of the roof molding 50 before insertion. FIG. 6 further illustrates deformation of the roof molding 60 after insertion by dashed and single-dotted lines and by reference numerals with "z".

The roof molding 60 illustrated in FIG. 7 includes a column portion 64 and a leg portion 66 having shapes different from those in the roof molding 20 illustrated in FIG. 4. Specifically, the column portion 64 and the leg portion 66 are asymmetrical in order to avoid contact between a protrusion 62b, which will be described below, and the leg portion 66. Further, the leg portion 66 of the roof molding 60 includes a recess between right and left legs to adjust elasticity of the leg portion 66. The leg portion 66 includes, toward the left, a left leg portion 66b, a bent portion 66c, and a left foot portion 66d, and includes, toward the right, a right leg portion 66e, a bent portion 66f, and a right foot portion 66g, substantially similar to the roof molding 20 illustrated in FIG. 4. The left foot portion 66d and the right foot portion 66g press the side wall faces 16g and 24g, respectively, to thereby secure the roof molding 60 to the groove 26.

The end 30b of the lid portion 62 of the roof molding 60 that is closer to the roof panel 16 has a shape similar to that in the roof molding 20 illustrated in FIG. 4. The roof molding 60, however, includes the protrusion 62b and a brittle part 62c on an undersurface 62a of the lid portion 62. The protrusion 62b includes a first wall portion 62b1 extending downward and a second wall portion 62b2 extending from the lower part of the first wall portion toward the side wall face 16g. When the roof molding 60 is inserted in the groove 26, the protrusion 62b and the left foot portion 66d are not in contact with each other, and are separated from each other by a distance which would not bring them into contact with each other even in deformation. The leading end of the second wall portion 62b2 of the protrusion 62b is in contact with the side wall face 16g and slightly presses the side wall face 16g. The brittle part 62c is formed by decreasing the thickness of the lid portion 62 on the undersurface 62a at a portion of the root of the protrusion 62b located toward the column portion.

A state where upward external force is applied to the end 30b of the lid portion 62 will be considered. As illustrated in FIG. 7, when the end 30bz is about to be removed upward, the lid portion 62z slightly rotates clockwise about a rotation center 62dz above the brittle part 62c. At this time, the tip end of the second wall portion 62b2 of the protrusion 62bz strongly presses the side wall face 16g. The tip end of the second wall portion 62b2 resultantly receives reaction from the side wall face 16g, so that the protrusion 62bz and the end 30bz receive a counterclockwise moment which limits their movements. Further, significant frictional force acting between the second wall portion 62b2 and the side wall face 16g inhibits the second wall portion 62b2 from slipping on the side wall face 16g. This prohibits upward movement of the end 30bz, thereby inhibiting removal of the roof molding 60 from the groove 26.

This removal preventing structure may similarly be provided in the region toward the right side panel 24. The positions and shapes of the protrusion 62b and the brittle part 62c may be modified, as appropriate. In deformation, the removal preventing effect can be enhanced by allowing the protrusion 62b to strongly press the side wall face 16g while preventing the protrusion 62b from sliding along the side wall face 16g when the end 30b is displaced upward.

While in the above description, when the roof molding 60 illustrated in FIG. 7 is inserted in the groove 26, the tip end of the second wall portion 62b2 of the protrusion 62b is in contact with the side wall face 16g to slightly press the side wall face 16g, the tip end of the second wall portion 62b2 may be simply in contact with the side wall face 16g without pressing the side wall face 16g. In this structure, as soon as upward external force is applied to the end 30b of the lid portion 62, the tip end of the second wall portion 62b2 presses the side wall face 16g to thereby prevent removal of the roof molding 60. Alternatively, when the roof molding 60 is inserted in the groove 26, the tip end of the second wall portion 62b2 of the protrusion 62b may be separated from the side wall face 16g. In this structure, after the end 30b of the lid portion 62 deforms to a certain degree due to upward external force applied to the end 30b, the tip end of the second wall portion 62b2 presses the side wall face 16g to thereby prevent removal of the roof molding 60. The distance between the tip end of the second wall portion 62b2 of the protrusion 62b and the side wall face 16g should be set within a range that achieves the removal preventing effect for the roof molding 60.

The above description is based on the end views, FIG. 2 to FIG. 7. As the groove 26 is elongated along the length of a vehicle, and the roof moldings 20, 50, and 60 are formed by extrusion molding to have a uniform shape along their lengths, the roof moldings have a similar structure at any end face. However, the roof molding 20, 50, and 60 may be formed by die molding to have different shapes along the length, or a separate securing mechanism may be disposed in a region along the length of the groove 26, for example.

REFERENCE SIGNS LIST 10 vehicle top structure, 14 left side panel, 16 roof panel, 16a base face, 16b, 16d, 16f, 16h bent portion, 16c slope face, 16e lower step face, 16g side wall face, 16i bottom face, 18 window frame, 20, 22, 40, 50, 60 roof molding, 24 right side panel, 24a top surface, 24b, 24d, 24f, 24h bent portion, 24c slope face, 24e flat face, 24g side wall face, 24i bottom face, 26 groove, 26a opening portion, 28 coupling portion, 30 lid portion, 30a top surface, 30b, 30f end, 30c slope face, 30d, 30e undersurface, 32 column portion, 34 leg portion, 34a left leg portion, 34b, 34e bent portion, 34c left foot portion, 34d right leg portion, 34f right foot portion, 36 core member, 42 lid portion, 42*a* end, 52 lid portion, 52*a* undersurface, 52*b* protrusion, 52*c* brittle part, 52*d* rotation center, 62 lid portion, 62*a* undersurface, 62*b* protrusion, 62*b*1 first wall portion, 62*b*2 second wall portion, 62*c* brittle part, 64 column portion, 66 leg portion, 66*b* left leg portion, 66*c*, 66*g* bent portion, 66*d* left foot portion, 66*e* right leg portion, 66*g* right foot portion.

The invention claimed is:

1. A vehicle top structure comprising:
    a groove on a top surface of a roof, the groove formed in a coupling portion coupling a roof panel and a side panel of a vehicle; and
    a roof molding made of an elastic member and configured to be disposed in the groove, the roof molding including a lid portion configured to cover an upside of an opening portion of the groove, wherein
    the roof panel includes a slope face between a base face of the roof panel and the groove, the slope face descending from an end of the base face toward the groove, and
    when the roof molding is disposed in the groove, an end of the lid portion closer to the roof panel is in contact with the slope face.

2. The vehicle top structure according to claim 1, wherein the roof panel further includes, between the slope face and the groove, a lower step face extending horizontally from an end of the slope face to an open end of the groove at a height lower than the base face, the lower step face being configured to receive the lid portion of the roof molding.

3. The vehicle top structure according to claim 1, wherein the roof molding further comprises:
    a leg portion extending along a width of the groove, the leg portion having opposite ends configured to be inserted in the groove;
    a column portion coupling the lid portion and the leg portion; and
    a protrusion formed on an undersurface of the lid portion to extend downward, the protrusion being configured to face the roof panel when the roof molding is disposed in the groove.

4. The vehicle top structure according to claim 1, wherein the roof molding further comprises:
    a leg portion extending along a width of the groove, the leg portion having opposite ends being configured to press opposite side wall faces of the groove;
    a column portion coupling the lid portion and the leg portion; and
    a protrusion including a first wall portion disposed on an undersurface of the lid portion at a location further toward the roof panel with respect to the column portion, the first wall portion extending downward, and a second wall portion extending from the first wall portion toward the roof panel, wherein
    when the roof molding is disposed within the groove, the second wall portion faces a side wall face closer to the roof panel of the opposite side wall faces of the groove.

5. The vehicle top structure according to claim 3, wherein the lid portion includes a brittle part between the protrusion and the column portion, and
    when a portion of the lid portion close to the roof panel is lifted upward, the lid portion deforms around the brittle part.

6. The vehicle top structure according to claim 4, wherein the lid portion includes a brittle part between the protrusion and the column portion, and
    when a portion of the lid portion close to the roof panel is lifted upward, the lid portion deforms around the brittle part.

* * * * *